Patented Oct. 31, 1950

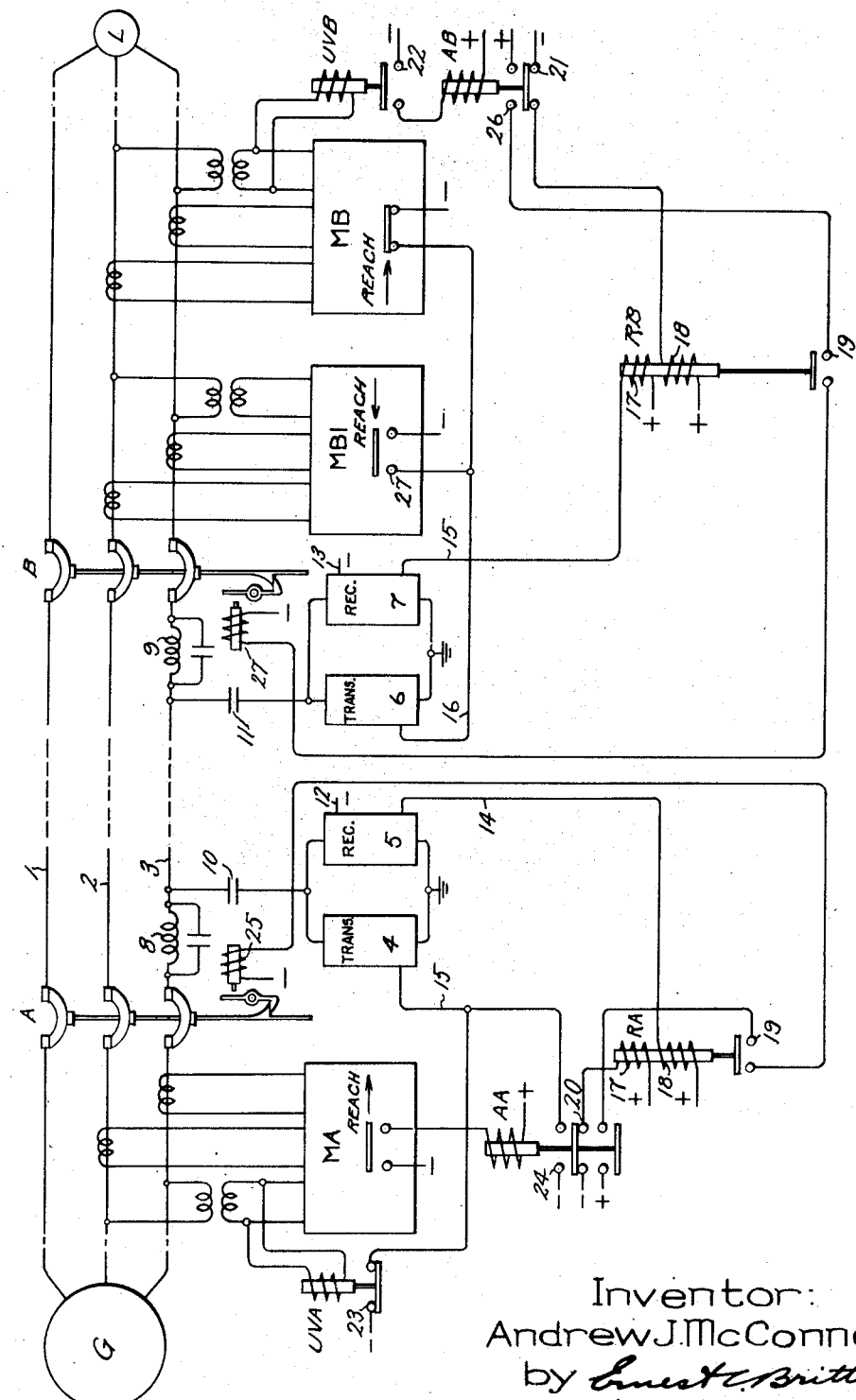

2,528,237

UNITED STATES PATENT OFFICE 2,528,237

ELECTRIC PROTECTIVE SYSTEM

Andrew J. McConnell, Delmar, N. J., assignor to General Electric Company, a corporation of New York Application September 28, 1949, Serial No. 118,424

4 Claims. (Cl. 175—294)

My invention relates to electric protective systems and particularly to a selective relay arrangement for affording protection against relatively low current phase faults in a section of an electric system having a source of generation at one end and a load at the other end.

In protective arrangements for power lines which interconnect a source of generation and a resistive load, it is of little importance whether the circuit breaker disposed at the load end of a particular line section is opened or not when a fault occurs on the line section since opening of the circuit breaker at the source end of the protected section will effectively de-energize the line. If the load comprises an appreciable amount of rotating machinery, a fault condition which ordinarily would be cleared by opening the source circuit breaker might be caused to persist due to the relatively low current generator action of the load. Hence, rapid reclosing of the source circuit breaker may not be successful under these conditions. Ordinary fault responsive relays connected to trip the circuit breaker at the load end of the protected section in response to fault conditions within the protected line section might fail to operate due to an insufficient amount of current generated by rotating machinery comprising the load. A similar situation might exist if a relatively low capacity source of generation were connected to the system so as to cause a small fault current to flow into the protected section during an internal fault.

A principal object of my invention is to provide an arrangement for isolating a section of a power system upon the occurrence of an internal phase fault where the available fault current which can flow into one end of the protected section is below a predetermined value.

In accordance with my invention, I cause disconnection of one end of a protected line section by utilizing relay means which responds to a reduction in the line to line voltage of the system and I provide selective relay means for preventing disconnection of such end of the protected section upon the occurrence of an external fault but not upon the occurrence of an internal fault.

The single figure of the drawing schematically shows an electric power system embodying one specific form of my invention. In the drawing, I have shown a polyphase power circuit comprising conductors 1, 2 and 3. The protective arrangement shown in the drawing is for the purpose of protecting conductors 2 and 3 against phase fault conditions. For purposes of simplicity, I have omitted from the drawing an arrangement for affording protection against phase faults involving conductors 1 and 2 on the one hand and conductors 1 and 3 on the other hand. It will be understood that a protective arrangement such as is shown for conductors 2 and 3 would be utilized for protecting the other phases of the system.

Conductors 1, 2 and 3 interconnect a large capacity source of generation G and a low capacity source of generation L. It will be understood that the generation indicated at L could comprise a motor which would act as a source of generation during a fault condition. The portions of conductors 1, 2 and 3 which interconnect circuit breakers A and B comprise the section of the system protected in accordance with my invention. The relays MA, MBI and MB are of conventional wattmetric type of construction and could be of the well-known mho type. These relays are energized by an electrical quantity derived from conductors 2 and 3 through the agency of current transformers associated with conductors 2 and 3 and also by a quantity derived from the potential between these conductors in a manner well-known in the art. Relay MA is associated with interrupter A and is provided with a reach which extends along the protected section from the terminal at circuit breaker A to a point slightly to the right of the terminal at circuit breaker B. Relay MA will close its contacts upon the occurrence of a predetermined fault within the protected line section or within a short distance to the right of interrupter B. Relay MB is located at the terminal controlled by interrupter B and is provided with a reach which extends to a point to the right of interrupter B definitely beyond the reach of relay MA at interrupter A. Relay MB may also reach somewhat into the protected section. If relay MB does reach into the protected section, relay MBI must be provided. Relay MBI is located at the terminal controlled by interrupter B and is provided with a reach extending from the terminal at circuit breaker B in a direction toward the terminal controlled by interrupter A and with a reach definitely in excess of the reach of relay MB in the direction of interrupter A. Thus relay MBI can establish a blocking carrier signal if relay MB operates for an internal fault. Of course, if relay MB does not reach into the protected section, relay MBI would not be necessary.

Relays UVA and UVB are of the undervoltage type and are responsive to a predetermined reduction of the voltage between conductors 2 and 3 at their respective ends of the protected section. Relay UVA is adjusted with a highly sensitive setting while relay UVB is arranged with a setting less sensitive than that of relay UVA. Relays AA and AB are auxiliary relays controlled respectively by relays MA and UVB.

The carrier blocking system schematically disclosed in the drawing could be of the type disclosed in my Patent 2,394,089, granted February 5, 1946, and assigned to the assignee of this invention. Essentially, the carrier system shown in the drawing comprises a transmitter 4 and a receiver 5 at the terminal controlled by interrupter A, and a transmitter 6 and a receiver 7 at the terminal controlled by interrupter B. Suitable line traps 8 and 9 are associated with conductor 3 and are located near the ends of the protected section. As is well-known, line traps 8 and 9 comprise a reactance and a capacitance appropriately tuned to offer low impedance to the system current at the system frequency. The line traps effectively block passage of high frequency carrier signals which are superimposed on conductor 3 so as to confine the carrier signal within the protected section and between line traps 8 and 9. Transmitter 4 and receiver 5 are coupled to conductor 3 by a suitable capacitor 10 while the transmitter 6 and receiver 7 are coupled to conductor 3 by capacitor 11. As is well-known, generation of a high frequency carrier signal by transmitter 4 or by transmitter 6 will render receiver 5 and receiver 7 operative to conduct an electric current through the circuit comprising conductors 12 and 14 associated with receiver 5 and through the circuit comprising conductors 13 and 15 associated with receiver 7. Transmitters 4 and 6 will not transmit a carrier signal if a suitable negative bias is supplied thereto through conductors 15 and 16 respectively as is well known.

Receiver relays RA and RB are each provided with a pair of windings 17 and 18. Relays RA and RB are constructed so that their contacts 19 will be maintained in the open position so long as current is flowing through either of the windings 17 or 18. As shown in the drawing, the coil 17 of relay RA is controlled by contacts 20 of auxiliary relay AA while winding 18 of relay RA is energized when receiver 5 is rendered conductive as a result of the generation of a carrier signal by transmitter 4 or by transmitter 6. In like manner, the winding 17 of relay RB is controlled by receiver 7 while winding 18 of receiver relay RB is controlled by contacts 21 of auxiliary relay AB which auxiliary relay is controlled by undervoltage relay UVB having normally open contacts 22.

When an internal fault occurs which involves phases 2 and 3, relay MA closes its contacts and relay UVA opens its contacts 23. Opening of contacts 23 momentarily removes the negative bias from transmitter 4 and thus causes that transmitter to supply a carrier signal to receivers 5 and 7 which in turn respectively energize winding 18 of relay RA and winding 17 of relay RB. Closing of the contacts of relay MA energizes the coil of relay AA whose contacts 24 close and reapply negative bias to transmitter 4 thus causing de-energization of coil 18 of relay RA and coil 17 of relay RB. Opening of contacts 20 of auxiliary relay AA deenergizes coil 17 of relay RA. With both coils of receiver relay RA deenergized, its contacts 19 will close thus completing the circuit to the trip coil 25 of circuit breaker A causing opening of that circuit breaker.

Because the generation indicated at L may be low enough in capacity as not to cause proper operation of ordinary current responsive relays at the terminal controlled by circuit breaker B, I provide the undervoltage relay UVB which upon the occurrence of an internal phase fault involving lines 2 and 3 within the protected section closes its contacts 22 thus operating relay AB to close contacts 26 and open contacts 21. Opening of contacts 21 of auxiliary relay AB de-energizes winding 18 of relay RB. Since winding 17 of relay RB is de-energized also, relay RB will close its contacts 19 thereby completing a trip circuit to the coil 27 of circuit breaker B causing opening of that breaker. Since relay MB may have a reach slightly to the left of circuit breaker B and since the low capacity source L may provide sufficient current to operate relay MB for an internal fault a short distance to the left of circuit breaker B, relay MB may cause an undesired blocking carrier signal to be established by transmitter 6. To provide for this possibility, I provide the relay MB1 which would apply negative bias to transmitter 6 for any condition which might cause relay MB to operate for an internal fault.

Should a phase fault occur between generator G and circuit breaker A on lines 2 and 3, relay UVA will open its contacts 23 thus removing the negative bias from transmitter 4. Thus, the carrier signal will be transmitted to receivers 5 and 7 which signal effectively prevents relays RA and RB from closing their contacts since current is thus caused to flow through their windings 18 and 17 respectively. Thus, for a fault on lines 2 and 3 between interrupter A and generator G, neither of the interrupters A or B would trip.

Since relay MB has a reach extending toward the generation at L and which extends beyond the reach of relay MA, a fault anywhere to the right of interrupter B and within the reach of relay MB will cause relay MB to open its contacts and thereby to initiate the generation of a blocking carrier signal by transmitter 6 by removing the negative bias from that transmitter. In this way undesired tripping of either interrupter A or interrupter B is prevented for a fault between interrupter B and the generation L and which is within the reach of relay MB.

A phase fault between interrupter B and generation L beyond the reach of relay MB might cause relay UVB to close its contacts without operating relay MB. Undesired tripping would be prevented, however, since relay UVA is provided with a more sensitive setting than relay UVB so that relay UVA would be sure to operate for any voltage reduction which would cause operation of relay UVB. Operation of relay UVA would remove the negative bias from transmitter 4 and thus cause the propagation of a blocking carrier signal which would prevent tripping of interrupter B. In this way, undesired tripping is prevented for faults between interrupter B and the generation L and which are beyond the reach of relay MB.

Thus, in accordance with my invention complete protection against all types of phase faults is provided for a protected section of a power system wherein one end of the protected section may not receive more than a predetermined amount of fault current which would be insufficient to operate ordinary relays dependent upon the magnitude of fault current.

While I have shown and described particular embodiments of my invention, it will be obvious to those skilled in the art that various changes and modifications can be made without departing from my invention and I, therefore, intend in the appended claims to cover all such changes and modifications as fall within the true spirit and scope of my invention.

What I claim as new and desire to secure by Letters Patent of the United States is:

1. In a selective relay arrangement for protecting a section of an electric power line having a source of generation connected to each end thereof, one of said sources having substantially less capacity than the other of said sources, the combination of first undervoltage relay means responsive to a predetermined reduction of the system voltage having means controlled thereby for causing disconnection of said one source of generation from the protected section, relay means responsive to predetermined faults on the line between said one source of generation and the protected section having means controlled thereby for rendering said first undervoltage relay means ineffective to cause disconnection of said one source of generation, second undervoltage relay means of greater sensitivity than said first undervoltage means having means controlled thereby for rendering said first undervoltage relay means ineffective to cause disconnection of said one source of generation upon the occurrence of faults between said one source of generation and the protected section other than said predetermined faults, and relay means responsive to a fault within the protected section having means controlled thereby for rendering said second undervoltage relay means ineffective to prevent disconnection of the protected section from said one source of generation.

2. In a selective relay arrangement for protecting a section of an electric power line having a source of generation connected to each end thereof, one of said sources having substantially less capacity than the other of said sources, the combination of first undervoltage relay means responsive to a predetermined reduction of the system voltage having means controlled thereby for causing disconnection of said one source of generation from the protected section, relay means responsive to predetermined faults on the line between said one source of generation and the protected section having means controlled thereby for rendering said first undervoltage relay means ineffective to cause disconnection of said one source of generation, second undervoltage relay means of greater sensitivity than said first undervoltage means having means controlled thereby for rendering said first undervoltage relay means ineffective to cause disconnection of said one source of generation upon the occurrence of faults between said one source of generation and the protected section other than said predetermined faults and upon the occurrence of faults on the line between said other source of generation and the protected section, and relay means responsive to a fault within the protected section having means controlled thereby for rendering said second undervoltage relay means ineffective to prevent disconnection of the protected section from said one source of generation.

3. In a selective relay arrangement for protecting a section of an electric power line having a source of generation connected to each end thereof, one of said sources having substantially less capacity than the other of said sources, the combination of first undervoltage relay means responsive to a predetermined reduction of the system voltage having means controlled thereby for causing disconnection of said one source of generation from the protected section, second undervoltage relay means of greater sensitivity than said first undervoltage means having means controlled thereby for rendering said first undervoltage relay means ineffective to cause disconnection of said one source of generation upon the occurrence of faults causing operation of said first undervoltage relay means, and relay means responsive to faults within the protected section having means controlled thereby for rendering said second undervoltage relay means ineffective to prevent disconnection of said one source of generation from the protected section.

4. An arrangement for controlling a terminal of a protected section of an electric power line for which terminal the maximum available fault current is below a predetermined value for predetermined faults within the section, said arrangement comprising, first undervoltage relay means responsive to a predetermined reduction of the system voltage for causing disconnection of said terminal, other undervoltage relay means of greater sensitivity than said first undervoltage relay means for rendering said first undervoltage relay means ineffective to disconnect said terminal upon the occurrence of faults causing operation of said first undervoltage relay means, and relay means responsive to the predetermined faults within the protected section for rendering said other undervoltage relay means ineffective to prevent disconnection of said terminal.

ANDREW J. McCONNELL.

REFERENCES CITED

The following references are of record in the file of this patent:

UNITED STATES PATENTS

| Number | Name | Date |
| --- | --- | --- |
| 1,878,669 | Breisky | Sept. 20, 1932 |
| 2,337,837 | Reagan | Dec. 28, 1943 |